(12) United States Patent
Perkins et al.

(10) Patent No.: US 11,189,389 B2
(45) Date of Patent: Nov. 30, 2021

(54) HIGH VOLTAGE SUPPLY FOR COMPACT RADIATION GENERATOR

(71) Applicant: Schlumberger Technology Corporation, Sugar Land, TX (US)

(72) Inventors: Luke T. Perkins, Clamart (FR); Christian Stoller, Sugar Land, TX (US); Peter Wraight, Skillman, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/692,121

(22) Filed: Nov. 22, 2019

(65) Prior Publication Data

US 2020/0098485 A1 Mar. 26, 2020

Related U.S. Application Data

(63) Continuation of application No. 15/952,277, filed on Apr. 13, 2018, now Pat. No. 10,490,312, which is a (Continued)

(51) Int. Cl.
*G21G 4/02* (2006.01)
*H05H 3/06* (2006.01)
(Continued)

(52) U.S. Cl.
CPC .......... *G21G 4/02* (2013.01); *H05H 3/06* (2013.01); *G01V 5/10* (2013.01); *H01J 35/00* (2013.01);
(Continued)

(58) Field of Classification Search
CPC .. G01V 5/10; H01J 35/00; H01J 35/04; H01J 35/14; H01J 2235/023
See application file for complete search history.

(56) References Cited

U.S. PATENT DOCUMENTS 2,365,855 A * 12/1944 Atlee ................... H01J 35/025
378/105
2,651,727 A 9/1953 Werner
(Continued)

FOREIGN PATENT DOCUMENTS

EP 2389790 A1 11/2011
GB 2444801 A * 6/2008 .............. H01J 35/06
(Continued)

OTHER PUBLICATIONS

"Custom Capacitor Solutions to Unique Problems," Advanced Monolithic Ceramics, Inc., Created Oct. 1, 2008 (2 pages).
(Continued)

*Primary Examiner* — Lily C Garner
(74) *Attorney, Agent, or Firm* — Trevor G. Grove

(57) ABSTRACT

Disclosed is a radiation logging tool, comprising a tool housing; a compact generator that produces radiation; a power supply coupled to the compact generator; and control circuitry. Embodiments of the compact generator comprise a generator vacuum tube comprising a source generating charged particles, and a target onto which the charged particles are directed; and a high voltage supply comprising a high voltage multiplier ladder located laterally adjacent to the generator vacuum tube. The high voltage supply applies a high voltage between the source and the target to accelerate the charged particles to a predetermined energy level. The compact generator also includes an electrical coupling between an output of the high voltage supply and the target of the generator vacuum tube to accommodate the collocated positions of the generator vacuum tube and the high voltage power supply.

20 Claims, 6 Drawing Sheets

Related U.S. Application Data continuation of application No. 13/510,255, filed as application No. PCT/US2010/056660 on Nov. 15, 2010, now Pat. No. 9,947,426.

(60) Provisional application No. 61/261,398, filed on Nov. 16, 2009, provisional application No. 61/261,394, filed on Nov. 16, 2009.

(51) Int. Cl.

| | | |
|---|---|---|
| G01V 5/10 | (2006.01) | |
| H01J 35/04 | (2006.01) | |
| H01J 35/14 | (2006.01) | |
| H01J 35/00 | (2006.01) | |
| H05G 1/10 | (2006.01) | |
| H05G 1/02 | (2006.01) | |
| H05G 1/00 | (2006.01) | |

(52) U.S. Cl.
CPC .............. *H01J 35/04* (2013.01); *H01J 35/14* (2013.01); *H01J 2235/023* (2013.01); *H05G 1/00* (2013.01); *H05G 1/02* (2013.01); *H05G 1/10* (2013.01)

(56) References Cited

U.S. PATENT DOCUMENTS

| | | | | |
|---|---|---|---|---|
| 3,061,728 A | * | 10/1962 | Arnold | G01V 5/10 376/119 |
| 3,508,058 A | | 4/1970 | Frentrop | |
| 3,992,633 A | * | 11/1976 | Braun | H05H 5/02 378/2 |
| 4,210,813 A | * | 7/1980 | Romanovsky | H05H 3/06 378/101 |
| 4,320,446 A | | 3/1982 | Langford et al. | |
| 4,646,338 A | * | 2/1987 | Skillicorn | H01J 35/04 378/110 |
| 4,694,480 A | * | 9/1987 | Skillicorn | H05G 1/32 378/119 |
| 4,920,554 A | | 4/1990 | Gabbay et al. | |
| 5,023,769 A | | 6/1991 | Beland | |
| 5,077,771 A | * | 12/1991 | Skillicorn | H05G 1/06 378/102 |
| 5,450,467 A | * | 9/1995 | Pellegrino | H02M 7/106 378/205 |
| 5,523,556 A | * | 6/1996 | Meddaugh | G01T 1/208 250/207 |
| 5,523,939 A | | 6/1996 | Stephenson | |
| 5,680,431 A | * | 10/1997 | Pietras, III | H01J 35/065 378/119 |
| 5,825,024 A | | 10/1998 | Badruzzaman | |
| 6,242,825 B1 | * | 6/2001 | Mori | H02K 3/30 174/127 |
| 6,769,487 B2 | | 8/2004 | Hache | |
| 6,885,728 B2 | * | 4/2005 | Hadland | H01J 35/045 378/109 |
| 7,148,471 B2 | | 12/2006 | Roscoe et al. | |
| 7,224,768 B2 | * | 5/2007 | Domoto | H05G 1/56 378/93 |
| 7,305,065 B2 | * | 12/2007 | Takahashi | H05G 1/12 378/101 |
| 7,448,802 B2 | * | 11/2008 | Oettinger | H05G 1/10 378/203 |
| 7,564,948 B2 | | 7/2009 | Wraight et al. | |
| 7,672,432 B2 | * | 3/2010 | Bosello | H05G 1/34 378/101 |
| 7,839,254 B2 | * | 11/2010 | Dinsmore | H01F 19/08 336/212 |
| 7,903,432 B2 | * | 3/2011 | Luo | H05G 1/12 363/13 |
| 7,949,099 B2 | * | 5/2011 | Klinkowstein | H05G 1/10 378/121 |
| 7,991,111 B2 | * | 8/2011 | Wraight | H01J 35/06 378/54 |
| 8,085,561 B2 | * | 12/2011 | Hanington | H02M 7/106 363/61 |
| 9,607,720 B2 | * | 3/2017 | Stubbers | H05H 6/00 |
| 10,955,582 B2 | * | 3/2021 | Jurczyk | G01V 5/10 |
| 2002/0014583 A1 | | 2/2002 | Bothner | |
| 2002/0170348 A1 | | 11/2002 | Roscoe et al. | |
| 2003/0081728 A1 | * | 5/2003 | Nathan | H05G 1/10 378/119 |
| 2006/0070443 A1 | | 4/2006 | Pristup | |
| 2011/0114830 A1 | | 5/2011 | Reijonen et al. | |
| 2013/0208840 A1 | | 8/2013 | Groves et al. | |
| 2013/0208841 A1 | | 8/2013 | Perkins | |

FOREIGN PATENT DOCUMENTS

| | | | | |
|---|---|---|---|---|
| GB | 2444801 A | | 6/2008 | |
| JP | H10174461 A | | 6/1998 | |
| JP | 2006073382 A | * | 3/2006 | .............. H05G 1/02 |
| WO | WO-9509520 A1 | * | 4/1995 | .............. G01N 23/18 |
| WO | WO-2005055676 A1 | * | 6/2005 | .............. H05G 1/06 |
| WO | 2009020996 A2 | | 2/2009 | |
| WO | 2009099887 A1 | | 8/2009 | |
| WO | 2010090795 A1 | | 8/2010 | |
| WO | 2011060282 A2 | | 5/2011 | |

OTHER PUBLICATIONS

"Performance Specifications and Acceptance Testing for X-Ray Generators and Automatic Exposure Control Devices," American Association of Physics in Medicine, Report No. 14, Jan. 1985 (98 pages).

Third Party Protest and claim chart filed on Feb. 12, 2014 in the related CA application 2781094 dated Feb. 12, 2014 (11 pages).

Extended Search Report issued in the related EP Application 10830841.2, dated Nov. 30, 2015 (9 pages).

International Search Report and Written Opinion issued in the related PCT application PCT/US2010/056658, dated Aug. 2, 2011 (8 pages).

International preliminary report on patentability issued in the related PCT application PCT/US2010/056658, dated May 22, 2012 (6 pages).

Examination Report issued in the related CA application 2781094, dated Apr. 29, 2015, (5 pages).

Examination Report issued in the related CA application 2781094, dated Mar. 27, 2017, (4 pages).

Extended Search Report issued in the related EP Application 10830842.0, dated Nov. 30, 2015 (8 pages).

Examination Report issued in the related CA application 2781097, dated Apr. 27, 2015 (5 pages).

Third Party Protest and claim chart filed on Feb. 12, 2014 in the related CA application 2781097 dated Feb. 12, 2014 (12 pages).

International Search Report and Written Opinion issued in the related PCT applicatoin PCT/US2010/056660, dated Jul. 28, 2011 (8 pages).

International Preliminary Report on Patentability issued in the related PCT applicatoin PCT/US2010/056660, dated May 22, 2012 (5 pages).

Communication Article 94(3) received in the related EP Applciation 10830842.0 dated Apr. 21, 2017 (5 pages).

Office Action issued in the related U.S. Appl. No. 13/510,243 dated May 17, 2018 (17 pages).

* cited by examiner

HIGH VOLTAGE SUPPLY FOR COMPACT RADIATION GENERATOR

CROSS-REFERENCE TO OTHER APPLICATIONS

This application is the Continuation of U.S. Non-Provisional application Ser. No. 15/952,277, filed on Apr. 13, 2018, which is a Continuation of U.S. Non-Provisional application Ser. No. 13/510,255, filed on Apr. 25, 2013, which is a National Stage Entry of PCT/US10/56660, filed on Nov. 15, 2010, which in turn claims priority to and the benefit of U.S. Provisional Application No. 61/261,398, filed provisionally on Nov. 16, 2009. This application also claims priority to and the benefit of U.S. Provisional Application No. 61/261,394, filed provisionally on Nov. 16, 2009. All the above applications are incorporated herein by reference.

TECHNICAL FIELD

The invention relates generally to borehole/oilfield electronic radiation generators.

BACKGROUND

Ionizing radiation has been used in the oilfield for well over half a century to enable measurements not possible with other formation probing techniques (such as electrical resistivity, acoustic, electro-magnetic, NMR, etc.). The broad types or kinds of ionizing radiation include charged particles, X-rays, gamma-rays, and neutrons.

Historically, the first method employed to produce ionizing radiation for oilfield applications involved radioactive sources. These radioactive sources (e.g. $^{137}$Cs, $^{241}$Am, $^{252}$Cf, $^{238}$Pu, etc.), were chosen, based on the application, for their emitted radiation type and in quantities sufficient for the desired intensity. Few naturally occurring radioactive sources emit neutrons during their decay, generally as a consequence of spontaneous fission. One example of a radioactive material with a significant probability for spontaneous fission is $^{252}$Cf. While $^{252}$Cf is used in some applications, its short half-life of only 2.6 y is generally considered a drawback. Many neutron sources rely on the generation of neutrons through a nuclear reaction, typically the $^9$Be(alpha, n)$^{12}$C reaction. Such sources consist of an alpha emitter, such as $^{241}$Am or $^{238}$Pu, mixed with Be-powder. The small nuclear reaction probability necessitates the use of a large amount of radioactive alpha emitter to generate a sufficient neutron output.

The small size and simplicity of the source housing, the reliability of continuous radioactive decay, and the typically low purchase cost make such radiation sources very attractive. The shortcomings, however, include limited radiation output, (particularly for neutron sources), issues of radiation safety because the source remains ON at all times, as well as the increase in the cost of the material and its disposal, the accountability (tracking/inventory requirements) and, for some like $^{252}$Cf, a short useful life. The absence of the ability to fast pulse ON/OFF a chemical source also limits the measurements that can be made.

To overcome these disadvantages of radioactive sources, electronic radiation generators were developed over the last several decades. Electronic radiation generators function by accelerating and colliding charged particles inside of sealed tubes to induce radiation-producing reactions. The two approaches to accelerating charged particles are to use linear accelerators (e.g., Linac) or circular accelerators (e.g., cyclotron). The linear accelerators employed in the oilfield, and of relevance to this particular invention disclosure, are electrostatic-based. Linear accelerators operate by creating a sufficiently large voltage difference between a source of charged particles and a target. Once the source is turned ON, charged particles entering the region of high voltage (HV) are accelerated to the predetermined desired energy and made to collide with a suitable target material to produce radiation. If either the ion source or the voltage are turned OFF, the radiation stops. The accelerated charged particles can be electrons, protons and heavier ions, which will generate ionizing radiation when they impinge on the target.

The intensity and energy of the radiation produced depends on the high voltage used to accelerate the charged particles. Typically, the higher the "high voltage" is, the higher the energy of the charged particles. High voltage power supplies capable of producing from tens to hundreds of kilovolts are desirable. A common power supply design employed is based on the Cockcroft-Walton voltage multiplier, also known as the Greinacher multiplier. Such a voltage multiplier includes an array of stages in series, shaped like a ladder, with each stage 100 comprising a pair of capacitors 102 and a pair of diodes 104 (see FIG. 1).

During each ON cycle, the A/C current supplied by the step up transformer 106 charges each respective capacitor 102, according to the rectification provided by the diodes 104. The maximum admissible voltage for each stage 100 depends on the capacitor and diode component ratings as well as on the AC voltage provided by the secondary of the step up transformer 106. To achieve a given high voltage, a ladder is constructed such that, to first order (i.e., neglecting losses, etc.), enough stages are used to sum up to the predetermined desired voltage. The high voltage output 108 of the series of stages, or ladder, can then be fed to a voltage divider (bleed resistors, discussed in further detail in related application Ser. No. 61/261,398, non-provisional application filed concurrently herewith, to obtain a measurement of the high voltage fed out to neutron generator tube.

One electrical constraint for the design of high voltage power supplies is that electrical hold off between high voltage and ground must be sufficient over the whole length of the power supply. Given the limited diameter available in downhole tools, the stage component size must be small enough to accommodate the necessary high voltage insulation over a very limited radial distance. Typically, the size of high voltage components increases with their voltage rating. A tradeoff must be made between the stage (and component) size and the necessary high voltage insulation based upon the voltage difference to neighboring ground potential. For borehole-size radiation generators, high voltage capacitor ratings are typically on the order of around a few kilovolts (e.g., five kilovolts). Typically, multi-layer capacitors are used to achieve the required capacitance, and are generally rectangular or box-shaped with radial leads. Thus, typically to produce from tens to hundreds of kilovolts requires a power supply with several dozens of stages. When the stages are placed end to end, this adds up to a significant overall length for the power supply.

Currently, the most frequently employed electronic radiation generator in the oilfield is the pulsed neutron generator (PNG), as shown in FIG. 2. Aside from the supporting low voltage electronics (current and pulsing supplies), a PNG comprises a high voltage power supply 202 (comprising comprises the step up transformer and the voltage multiplier), a sealed neutron generator tube 204 and a high voltage insulation system 206. The sealed neutron generator tube 204 includes an ion source 208 which is at or near ground potential, and separated from a target 210 by an HV acceleration column. The configuration of a PNG is generally cylindrical, as dictated by the borehole geometry, with the target 210 of the neutron generator tube 204 in contact with the high voltage end of the high voltage power supply 202. The necessary high voltage insulation (solid, liquid and/or gaseous or any combination thereof) surrounds the neutron generator tube 204 and high voltage power supply 202, with the entirety being contained in a hermetically-sealed pressure housing 212 (not to be confused with an overall tool pressure housing of a tool in which the present generator is utilized). Preferably, the pressure housing is cylindrical in shape. The conventional arrangement of these components is in a rectilinear configuration, where the high voltage power supply 202 is connected in line (on one axis or close to on one axis) to the high voltage end of the neutron generator tube 204 (see FIG. 2), frequently with a protective surge resistor 214 therebetween. The typical length of such a generator is often in the range from about 36 to 48 inches, or more.

The considerable length of a typical PNG configured as in FIG. 2 can impose significant limitations on the tool design and consequently the range of measurements possible to obtain. Because of the length of the high voltage power supply in the typical PNG, only the neutron generator tube end affords close proximity to the radiation source (i.e., the target). For most practical purposes, this limits detector placement to a single axial direction relative to the target. If a tool is intended to perform multiple different measurements with the radiation provided by the electronic source, it is likely that not all the required detectors can be placed at the optimal axial and/or radial position. A short radiation source would allow detector placements axially on both sides of the radiation source, and thus a better independent optimization of multiple measurements through optimal placement of multiple detectors.

DETAILED DESCRIPTION

In the following description, numerous details are set forth to provide an understanding of the present disclosure. However, it will be understood by those skilled in the art that the present invention may be practiced without these details and that numerous variations or modifications from the described embodiments are possible.

In light of the above discussion, it would be advantageous to reduce radiation generators, including a PNG, to as short and compact a size as possible.

Most pulsed neutron generators generate neutron radiation through the reaction of energetic deuterium with tritium (d-T) reaction. However, other known reactions, like d-D and t-T can be employed as well. X-rays are generated by directing energetic electrons onto a target. The scattering of the energetic electrons on the target leads to the emission of Bremsstrahlung x-rays and x-rays characteristic of the target material.

Figure 1:
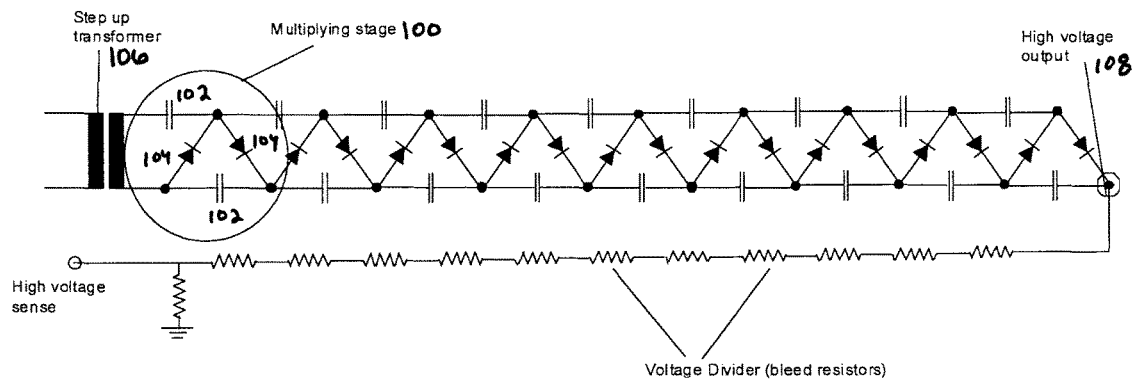
FIG. 1 shows a design of a prior art Cockcroft Walton voltage multiplier generator.
Figure 2:
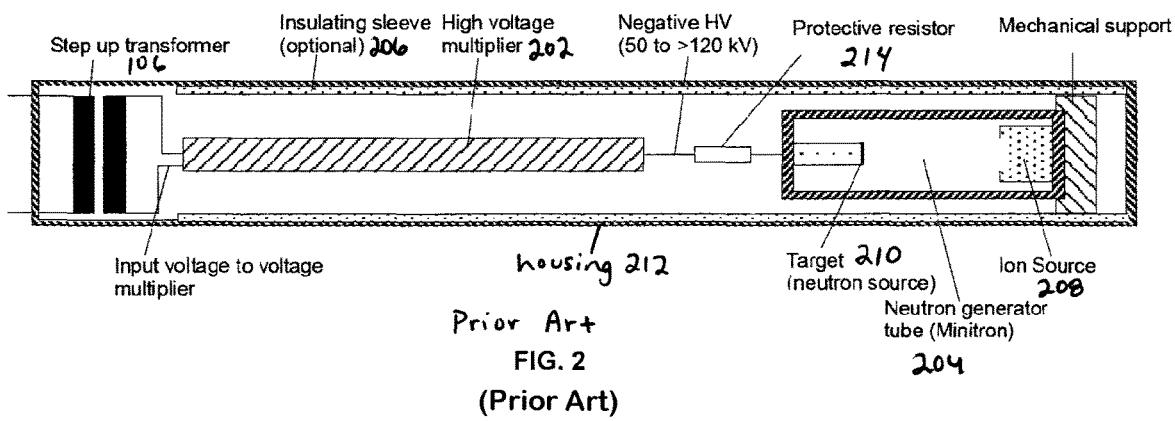
FIG. 2 shows a conventional prior art layout of a Pulsed Neutron Generator for downhole use.
Figure 3:
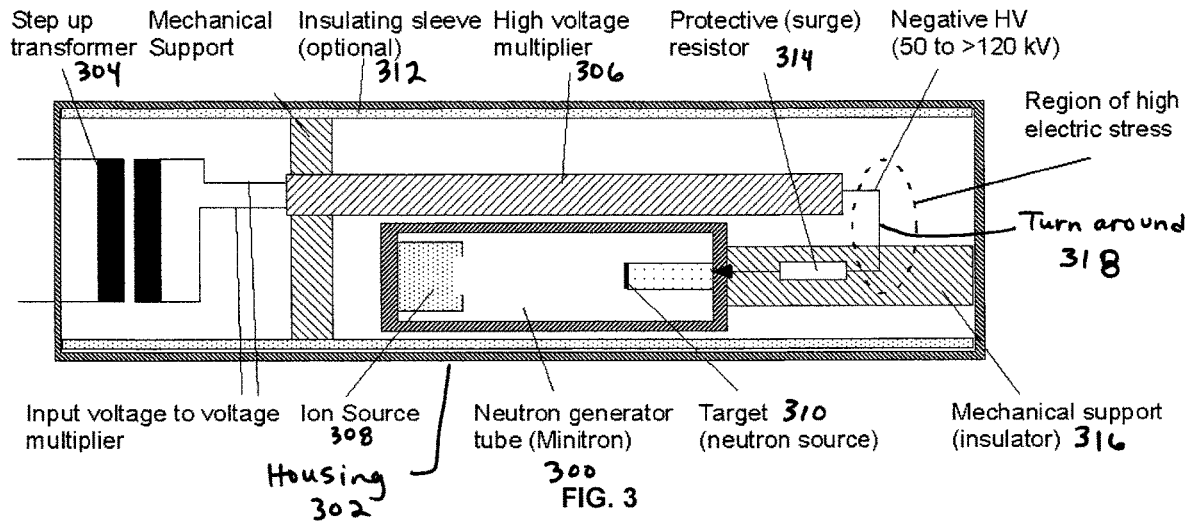
FIG. 3 shows a layout of a compact generator with collocated linear high voltage power supply and a neutron generator tube in one embodiment in accordance with the present disclosure.

The present disclosure discusses solutions for a compact generator collocated with a linear multi-stage power supply, such as a Cockcroft-Walton (CW) power supply. In a most preferred embodiment of the present disclosure, a multi-stage high voltage power supply, such as a Cockcroft-Walton styled voltage multiplier, would be employed, however parallel work on single-staged voltage multipliers indicates that single-staged voltage multipliers are also contemplated in the present disclosure, as any other axially collocated supplies could be used. An embodiment of a pulsed neutron generator collocated with its high voltage power supply is shown in FIG. 3. The neutron generator 300 is enclosed in a hermetically sealed housing 302 which contains the step-up transformer 304, which is powered by an external voltage source (not shown in FIG. 3). A stepped up high voltage on the order of several kilovolts powers the voltage multiplier 306, which appears above the neutron generator tube 300 in FIG. 3, though for practical purposes, the voltage multiplier 306 is situated substantially side-by-side, collocated with the neutron generator tube 300, thereby shortening the overall length required for the pulsed neutron generator. The neutron generator tube 300 contains an ion source 308 on one side and a target 310 on the other side on which accelerated beam particles impinge. The ion source 308 and the target 310 are separated by an accelerating region, which is surrounded by the insulating wall of the neutron generator tube 300. The wall of the neutron generator tube 300 may comprise, for example, a ceramic. The high voltage generated by the voltage multiplier 306 is fed to the target 310 through a protective resistor 314 (i.e., a surge resistor). The end of the neutron generator tube 300 having the target 310 is supported by an axial insulator 316 that may also serve as the mechanical support for the protective resistor 314. A high voltage turn-around 318 couples between the output of the high voltage multiplier 306 to the input of the neutron generator tube 300 (often through a protective surge resistor 314).

Figure 4:
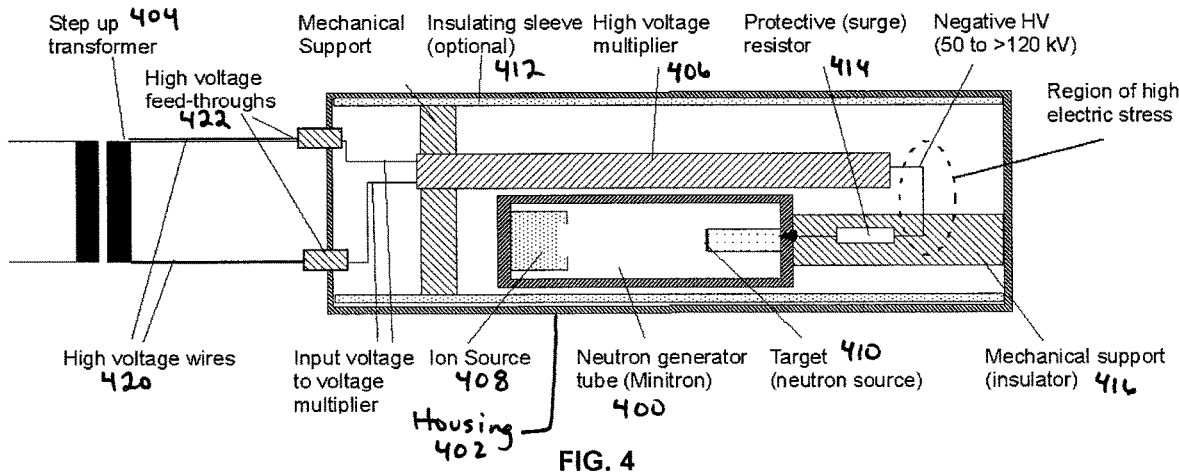
FIG. 4 shows a compact generator with an external step-up transformer in another embodiment in accordance with the present disclosure.

Referring now to FIG. 4, in an alternative embodiment, the step-up transformer 404 may be located outside of the generator housing 402 at a second location to allow a further reduction of the overall length of the pulsed neutron generator, wherein the step-up transformer 404 is coupled to the input of the high voltage multiplier 406 via high voltage wires 420 passing into the housing 402 via high voltage feed-through passages 422. One effect of such a configuration is that high voltages of 10 kV or more have to be connected over a distance of several feet to the generator. In the limited space of a downhole tool, such a configuration may pose problems due to the required diameter of the wires for such a connection (including high-voltage insulation) as well as noise induced by high voltage wiring. Despite these factors, locating the step-up transformer 404 outside of the generator housing 402 is a possible embodiment. In some embodiments, the end of the neutron generator tube 400 having the target 410 may be supported by an axial insulator 416 that may also serve as the mechanical support for the protective resistor 414. In some embodiments, the high voltage generated by the voltage multiplier 406 may be fed to the target 410 through the protective resistor 414.

Figure 5:
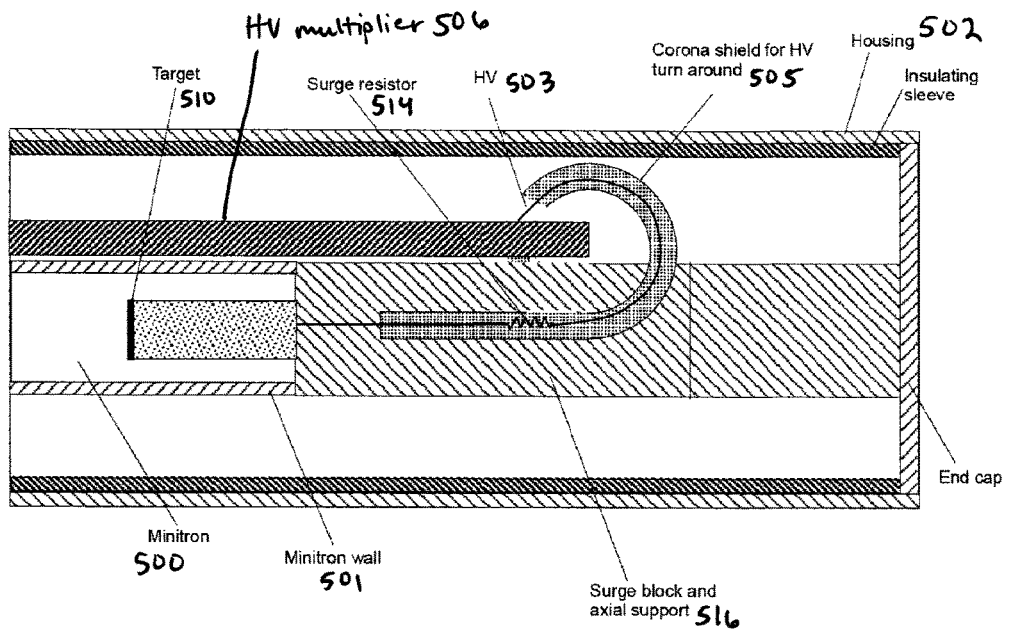
FIG. 5 shows a high voltage turn-around from end of ladder back to the neutron generator tube in another embodiment in accordance with the present disclosure.

Referring now to the embodiment of FIG. 5, the electrical connection from the end of the voltage multiplier 506 to the target 510 necessitates a turn-around 503 of the high voltage line. Given the proximity of the turn-around 503 to the ground plane at the end (shown right side of FIG. 5) of the generator housing 502, resulting electrical fields have the potential to lead to uncontrolled arcing. The turn-around 503 may therefore be protected by a corona shield 505 positioned so as to reduce electrical field stresses. A possible approach is shown in detail in FIG. 5.

As shown in FIG. 5, the target 510 end of the neutron generator tube 500 are shown contained in the wall 501. Adjacent to the neutron generator tube 500 is the voltage multiplier 506 with a high voltage line of the turn-around 503 exiting the voltage multiplier 506. The corona shield 505 is provided about the high voltage line of the turn-around 503 (and including about the surge resister 514). The corona shield 505 surrounding the high voltage line of the turn-around 503 (or other components at high electric potential) serves to reduce the electric field around such components or wires. Typically, it is a metallic conductor (other conducting materials can be used as well) with a highly polished surface and a large radius of curvature. The increased radius of curvature and the absence of surface irregularities (sharp edges and rough surface) minimize the electric field at the surface and reduce the probability of electron emission from the surface, which may lead to an electrical breakdown of the insulation. Additionally, the corona shield 505 may be coated by a thin insulating layer to further reduce the probability of electron emission from the surface.

Figure 6:
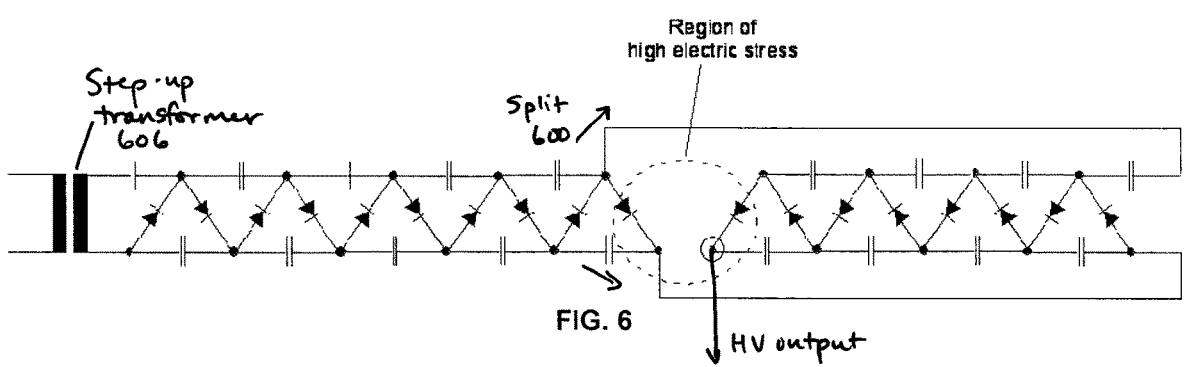
FIG. 6 shows a "split-and-flip" voltage multiplier ladder providing a reduced electrical potential at the ends allowing the shortest axial distance to ground in another embodiment in accordance with the present disclosure.

An alternate approach for reducing electrical stress at the turn-around is to "split-and flip" the voltage multiplier back on itself. The schematic in FIG. 6 illustrates this approach, which affords a reduction in the turn-around voltage stress, but at the expense of moving the electrical field stress midway through the voltage multiplier and adding to the complexity by feeding back high voltage wires. FIG. 6 shows the split 600 of the voltage multiplier at a certain stage, with feedback from the end back towards the middle, with the HV output at an intermediate of the voltage multiplier.

Figure 7:
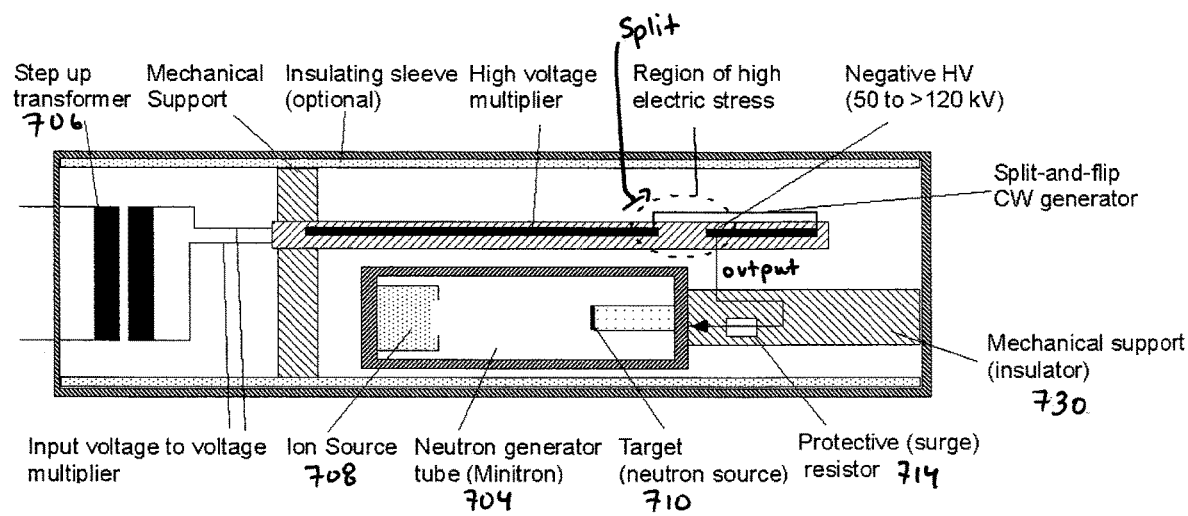
FIG. 7 shows a schematic layout of a neutron generator with a collocated "split-and-flip" voltage multiplier ladder in another embodiment in accordance with the present disclosure.

FIG. 7 shows the schematic layout of a neutron generator employing a "split-and-flip" voltage multiplier as outlined in FIG. 6. The region of high electric stress is indicated. An alternate embodiment of the "split-and-flip" approach is shown in FIG. 8 where the split divides the high voltage multiplier into a first section 806A located outside, but proximate, the sealed neutron generator tube 804, and a second section 806B located in-line with the sealed neutron generator tube 804 in a support 850.

Figure 9:
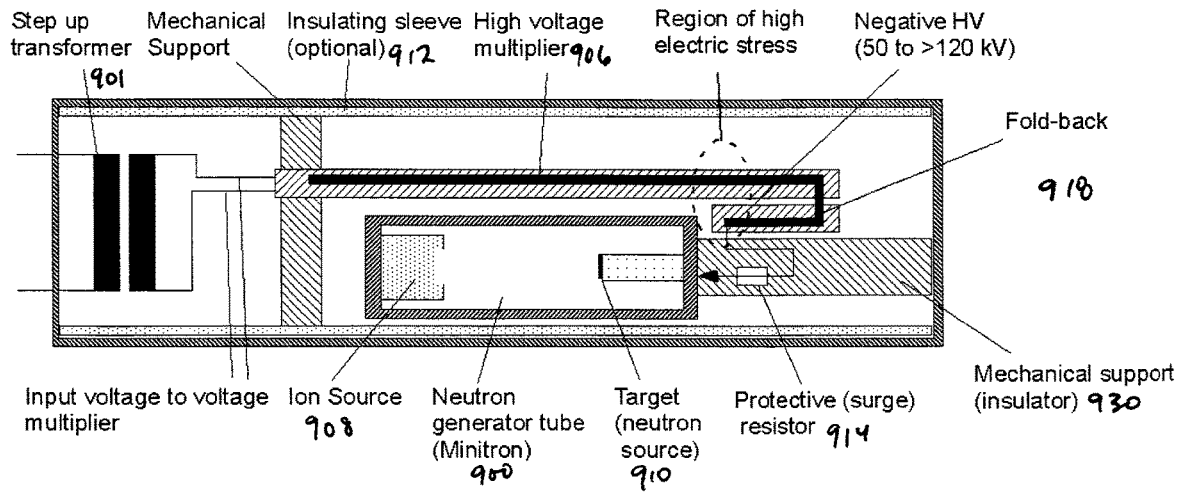
FIG. 9 shows a fold-back high voltage supply.

Yet another approach consists of folding the voltage multiplier itself and bringing it back as shown in FIG. 9. This means that some of the multiplier stages are located underneath the main support of the high voltage supply that contains the majority of the multiplier stages. This results in a similar reduction of the high voltage stresses at the position closest to the end of the generator as in FIG. 7. In both cases, the high voltage at the far end of the HV supply is lower than the maximum high voltage. This may allow a reduction in the length of the insulating mechanical support and as a consequence a shorter overall length of the PNG. In this case, the portion of the voltage multiplier that is folded back requires additional room underneath the supply.

Figure 10:
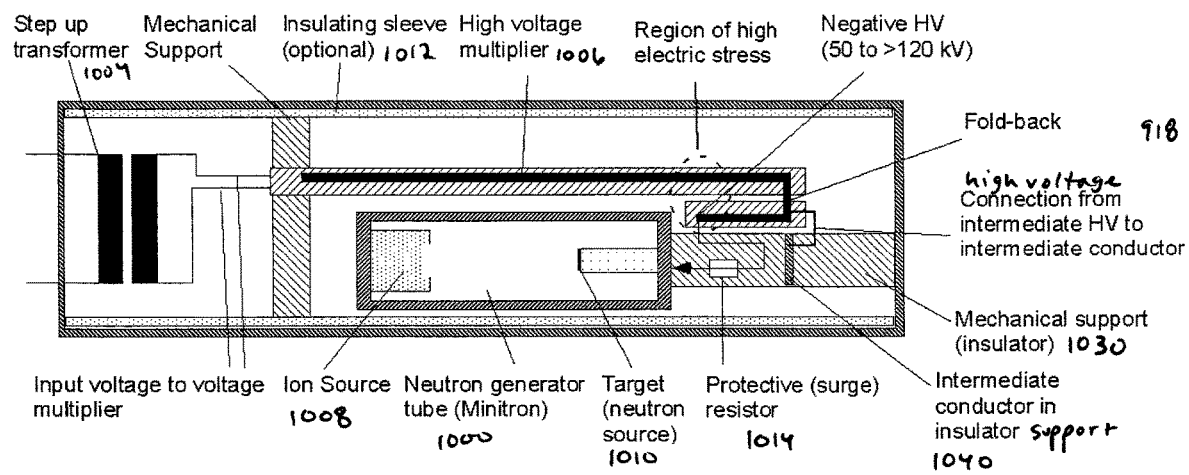
FIG. 10 shows a fold-back high voltage supply with intermediate electrode in insulating support in another embodiment in accordance with the present disclosure.

For both embodiments, an additional improvement can be accomplished by making sure that an axial plane coinciding with the fold of the voltage multiplier is at the same electrical potential as the folding point in the voltage multiplier. This can be accomplished by inserting a conductive plane into the insulating support that connects the end of the generator tube to the end of the generator housing. The additional electrically conducting plane is shown in FIG. 10.

Figure 8:
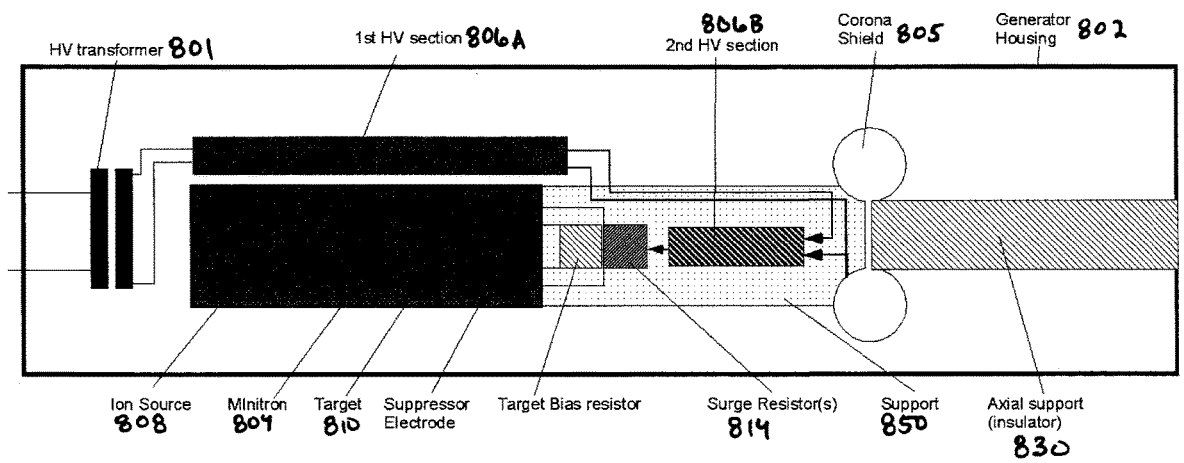
FIG. 8 shows an alternate implementation of "split and flip" ladder in accordance with the present disclosure.
Figure 11:
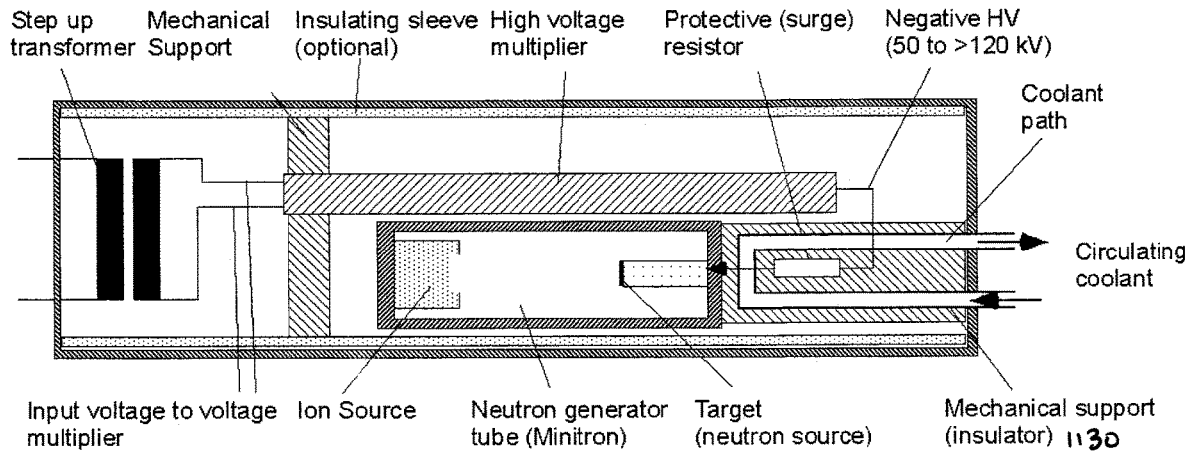
FIG. 11 shows a compact generator with insulating support with coolant channel in another embodiment in accordance with the present disclosure.

FIG. 8 can also be used for the folded voltage multiplier. The supporting insulator (shown in FIGS. 7-12) extending from the target end of the generator tube to the end of the generator housing is included not only for mechanical strength but also as a heat conducting medium to remove heat from the target. Typically, electrical insulators are poor thermal conductors and the Alumina ceramic is no exception to this rule. However, Aluminum nitride (AlN) is a much better conductor of heat while at the same time being a good electrical insulator. The insulating mechanical support 730, 830, etc. could therefore be manufactured of Aluminum nitride. Matters of heat conduction are critical for the reliable operation of the PNG at elevated temperature. A traditional d-T generator with a titanium-based target will stop working when the target temperature exceeds 250° C. At an ambient temperature of 150 or 175° C., the target temperature can reach or exceed 250° C. unless there is a proper heat sink. The insulating mechanical support, in particular if made of AlN, offers an excellent solution to this problem. Alternatively or additionally, one could envisage circulating an insulating fluid (gas or liquid) through the insulating support in order to evacuate heat (FIG. 11)

The ceramic support can be made in such a way that the heat evacuation from the CW voltage multiplier is facilitated to reduce the temperature seen in particular by the diodes but also by the capacitors.

Figure 12:
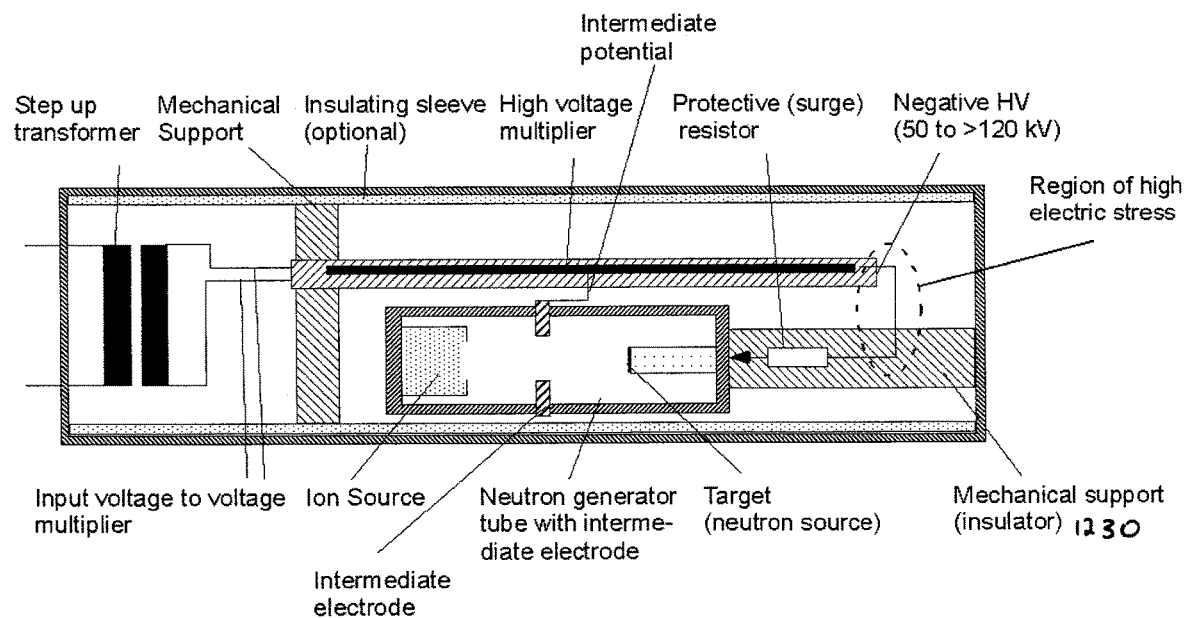
FIG. 12 shows a neutron generator with collocated voltage multiplier ladder connecting an intermediate potential from the ladder to the intermediate electrode of the neutron generator tube in another embodiment in accordance with the present disclosure.

Collocation of the voltage multiplier with the generator tube has additional advantages. It is feasible to tap off from intermediate stages of the CW generator to provide a well defined potential to one or more intermediate electrodes of the generator tube. Radiation generator tubes with multiple intermediate electrodes are described in more detail in the concurrently pending U.S. patent application Ser. No. 12/618,821 filed Nov. 16, 2009, entitled "Electrode Configuration for Downhole Nuclear Radiation Generator". An example of such an arrangement using an intermediate-electrode-neutron-tube is shown in FIG. 12. In order to protect the voltage multiplier from transients due to arcs to the intermediate electrode, it may be necessary to add a protective (surge) resistor between the intermediate voltage multiplier point and the intermediate electrode (not shown in FIG. 12). It is evident that the concept can be expanded to multiple electrodes with multiple intermediate potentials.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A compact device that generates radiation, comprising:
a generator vacuum tube comprising:
a source generating charged particles, and
a target onto which the charged particles are directed;
a high voltage supply comprising a step-up transformer and a high voltage multiplier ladder, wherein the high voltage multiplier ladder is located radially adjacent to the generator vacuum tube, the high voltage supply being configured to apply a high voltage between the source and the target to accelerate the charged particles to a predetermined energy level;
an electrical coupling between an output of the high voltage supply and the target of the generator vacuum tube, wherein the electrical coupling comprises a high voltage turn-around that accommodates an electrical field stress caused by the high voltage multiplier ladder being located radially adjacent to the generator vacuum tube; and
a housing that completely surrounds the high voltage multiplier ladder and the generator vacuum tube, wherein the step-up transformer is located outside the housing.

2. The compact device according to claim 1, further comprising a means for reducing electrical field stress at the high-voltage turn-around.

3. The compact device according to claim 1, the generated radiation comprising x-rays.

4. The compact device according to claim 1, wherein the compact device measures an overall length of less than about twenty (20) inches in length.

5. The compact device according to claim 2, wherein the means for reducing electrical field stress at the high-voltage turn-around comprises a fold in the high voltage multiplier ladder at an intermediate voltage point.

6. The compact device according to claim 1, further comprising a split in the high voltage multiplier ladder such that the two portions of the high voltage multiplier ladder turn directionally back toward the target.

7. The compact device according to claim 1, further comprising an electrically insulating axial support mechanically supporting the end of the generator vacuum tube that is most proximate the target, the electrically insulating axial support comprising a conducting layer positioned perpendicular to the axis of the electrically insulating axial support.

8. The compact device according to claim 7, wherein the electrically insulating axial support comprises Aluminum Nitride.

9. The compact device according to claim 7, the electrically insulating axial support further comprising an internal flow path configured for circulation of an insulating cooling fluid.

10. A radiation logging tool, comprising
a tool housing;
a compact generator that produces radiation through a reaction of energetic charged particles accelerated in a DC electrostatic field with a target on which the charged particles impinge;
a power supply operatively coupled to the compact generator;
control circuitry operatively coupled to the compact generator;
wherein the compact generator comprises:
a generator vacuum tube comprising:
a source generating charged particles, and
a target onto which the charged particles are directed;
a high voltage supply comprising a step-up transformer and a high voltage multiplier ladder, wherein the high voltage multiplier ladder is located radially adjacent to the generator vacuum tube, the high voltage supply being configured to apply a high voltage between the source and the target to accelerate the charged particles to a predetermined energy level;
an electrical coupling between an output of the high voltage supply and the target of the generator vacuum tube, wherein the electrical coupling comprises a high voltage turn-around that accommodates an electrical field stress caused by the high voltage multiplier ladder being located radially adjacent to the generator vacuum tube, and
a housing that completely surrounds the high voltage multiplier ladder and the generator vacuum tube, wherein the step-up transformer is located outside the housing.

11. The compact device according to claim 1, wherein the step-up transformer is coupled to an input of the high voltage multiplier ladder by high voltage wires that pass into the housing through high voltage feed-through passages.

12. The compact device according to claim 1, wherein the high voltage multiplier ladder is arranged along a single linear path.

13. The compact device according to claim 1, further comprising an axial insulator that mechanically supports an end of the generator vacuum tube that is most proximate the target.

14. The compact device according to claim 1, further comprising a protective surge resistor coupled between the output of the high voltage supply and the target of the generator vacuum tube.

15. The compact device according to claim 1, further comprising:
an axial insulator that mechanically supports an end of the generator vacuum tube that is most proximate the target; and
a protective surge resistor coupled between the output of the high voltage supply and the target of the generator vacuum tube, wherein the protective surge resistor is mechanically supported by the axial insulator.

16. The compact device according to claim 1, further comprising:
an axial insulator that mechanically supports an end of the generator vacuum tube that is most proximate the target; and
a protective surge resistor coupled between the output of the high voltage supply and the target of the generator vacuum tube, wherein:
the step-up transformer is coupled to an input of the high voltage multiplier ladder by high voltage wires that pass into the housing through high voltage feed-through passages,
the high voltage multiplier ladder is arranged along a single linear path, and
the protective surge resistor is mechanically supported by the axial insulator.

17. The radiation logging tool according to claim 10, wherein the step-up transformer is coupled to an input of the high voltage multiplier ladder by high voltage wires that pass into the housing through high voltage feed-through passages.

18. The radiation logging tool according to claim 10, further comprising an axial insulator that mechanically supports an end of the generator vacuum tube that is most proximate the target.

19. The radiation logging tool according to claim 10, further comprising a protective surge resistor coupled between the output of the high voltage supply and the target of the generator vacuum tube.

20. The radiation logging tool according to claim 10, further comprising:
- an axial insulator that mechanically supports an end of the generator vacuum tube that is most proximate the target; and
- a protective surge resistor coupled between the output of the high voltage supply and the target of the generator vacuum tube, wherein:
  - the step-up transformer is coupled to an input of the high voltage multiplier ladder by high voltage wires that pass into the housing through high voltage feed-through passages,
  - the high voltage multiplier ladder is arranged along a single linear path, and
  - the protective surge resistor is mechanically supported by the axial insulator.

* * * * *